US009336034B2

(12) United States Patent
Halim et al.

(10) Patent No.: US 9,336,034 B2
(45) Date of Patent: May 10, 2016

(54) DISPLAY OF HOST OPERATING SYSTEM USER INTERFACE ELEMENTS WITHIN A GUEST OPERATING SYSTEM OF A VIRTUAL MACHINE

(75) Inventors: Irwan Halim, Houston, TX (US); William R Whipple, Magnolia, TX (US); Norman P Brown, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 201 days.

(21) Appl. No.: 14/127,857

(22) PCT Filed: Jun. 28, 2011

(86) PCT No.: PCT/US2011/042174
§ 371 (c)(1),
(2), (4) Date: Apr. 11, 2014

(87) PCT Pub. No.: WO2013/002766
PCT Pub. Date: Jan. 3, 2013

(65) Prior Publication Data
US 2014/0223432 A1    Aug. 7, 2014

(51) Int. Cl.
*G06F 9/455* (2006.01)
*G06F 9/44* (2006.01)

(52) U.S. Cl.
CPC .......... *G06F 9/45545* (2013.01); *G06F 9/4445* (2013.01); *G06F 9/4416* (2013.01); *G09G 2330/026* (2013.01); *G09G 2360/04* (2013.01)

(58) Field of Classification Search
None
See application file for complete search history.

(56) References Cited

U.S. PATENT DOCUMENTS

| 5,862,404 | A | 1/1999 | Onaga |
| 6,437,803 | B1 | 8/2002 | Panasyuk et al. |
| 7,370,324 | B2 | 5/2008 | Goud et al. |
| 7,506,265 | B1 * | 3/2009 | Traut ............... G06F 9/4443 715/763 |
| 7,681,134 | B1 | 3/2010 | Grechishkin et al. |
| 7,739,726 | B2 | 6/2010 | Iwanski et al. |
| 8,209,408 | B1 * | 6/2012 | Huang .............. G06F 9/45558 709/223 |
| 8,326,449 | B2 * | 12/2012 | Hartz ................ G06F 8/65 700/200 |
| 9,009,701 | B2 * | 4/2015 | Moriki ............. G06F 9/455558 718/1 |
| 9,009,706 | B1 * | 4/2015 | Goyal .............. G06F 9/45545 709/223 |
| 9,075,497 | B1 * | 7/2015 | Sobel ................ G06F 3/0481 1/1 |
| 2004/0193461 | A1 | 9/2004 | Keohane et al. |
| 2005/0071840 | A1 | 3/2005 | Neiger et al. |
| 2006/0208871 | A1 | 9/2006 | Hansen |

(Continued)

FOREIGN PATENT DOCUMENTS

WO    WO-0193037    12/2001

OTHER PUBLICATIONS

Martinović et al. "Impact of the Host Operating Systems on Virtual Machine Performance", 2010, pp. 613-618.*

(Continued)

*Primary Examiner* — Van Nguyen
(74) *Attorney, Agent, or Firm* — HP Inc. Patent Department

(57) ABSTRACT

Example embodiments relate to the display of user interface elements of a host operating system within a virtual machine guest operating system. In example embodiments, the host OS transmits information relating to a user interface element displayed within the host OS to the guest OS. The guest OS may then output a corresponding user interface element, receive input from a user interacting with the corresponding element within the guest OS, and return information describing the user input from the guest OS to the host OS.

14 Claims, 5 Drawing Sheets

(56) References Cited

U.S. PATENT DOCUMENTS

| | | |
|---|---|---|
| 2007/0192765 A1 | 8/2007 | Shimogawa et al. |
| 2007/0239859 A1 | 10/2007 | Wilkinson et al. |
| 2008/0196043 A1 | 8/2008 | Feinleib et al. |
| 2009/0019436 A1* | 1/2009 | Hartz .................. G06F 8/65 717/178 |
| 2009/0070404 A1 | 3/2009 | Mazzaferri |
| 2009/0150884 A1 | 6/2009 | Fukuda |
| 2009/0183173 A1 | 7/2009 | Becker et al. |
| 2009/0222739 A1 | 9/2009 | Schmieder et al. |
| 2010/0077337 A1 | 3/2010 | Yang et al. |
| 2010/0146127 A1 | 6/2010 | Schmieder et al. |
| 2011/0010390 A1 | 1/2011 | Rajagopal et al. |
| 2011/0016312 A1 | 1/2011 | Iwanski et al. |

OTHER PUBLICATIONS

Aquino et al. "An intelligent web interface to generate and update adaptive virtual environments", 2010 IEEE, pp. 51-54.*

\* cited by examiner

DISPLAY OF HOST OPERATING SYSTEM USER INTERFACE ELEMENTS WITHIN A GUEST OPERATING SYSTEM OF A VIRTUAL MACHINE

BACKGROUND

In a virtual machine environment, a computing device executes an isolated operating system ("OS"), known as a guest OS, within the normal operating system of the device, known as the host OS. For example, suppose a user typically runs a primary OS, but desires to execute applications that can only be executed within another OS. By creating a virtual machine and configuring the virtual machine to run the other OS, the user can conveniently execute the desired applications in a separate, secure environment within the primary OS. This eliminates the need to separately boot the computing device to multiple operating systems because a hypervisor, an application running within the host OS, dynamically allocates hardware resources to the secondary OS.

BRIEF DESCRIPTION OF THE DRAWINGS

The following detailed description references the drawings, wherein.

DETAILED DESCRIPTION

As detailed above, virtual machines enable a user to execute a guest operating system within an isolated environment in a host operating system. In some virtual machine environments, the guest OS displays its user interface in a full screen mode or in a size and location that obscures the system tray and other user interface ("UI") elements of the host OS. In these situations, the user is therefore unable to observe and interact with the interface of the host OS.

For example, suppose an automatic update within the host OS has triggered a reboot message with a countdown, the user wishes to modify the volume of the audio interface using the control within the host OS, or a virus scan has started in the host OS and affected the performance of the virtual machine. In each of these cases, the virtual machine UI may prevent the user from interacting with the underlying interface element in the host OS. Each scenario is problematic, as the user may become frustrated with the system or lose data. At the same time, the alternatives of periodically minimizing the virtual machine window or utilizing a smaller window reduce the quality of experience for the user.

To address these issues, example embodiments disclosed herein provide for a communication mechanism between a host OS and guest OS by which the user may interact with user interface elements of the host OS within the guest OS window. For example, in some embodiments, one or more processes running within the host OS obtain information relating to interface elements displayed within the host OS by, for example, monitoring messages exchanged within the host OS. The host OS may then transmit the information describing the interface elements to the guest OS. In response, the guest OS may receive the interface element information, insert a corresponding interface element within the user interface of the guest OS, and receive input from the user interacting with the interface element within the guest OS. Finally, the guest OS may return information describing the user input to the host OS, such that the host OS may update the interface element and take any necessary actions.

In this manner, example embodiments disclosed herein allow a user to interact with important interface elements displayed within a primary OS, even when executing a guest OS. Example embodiments thereby maintain a high quality of experience for the virtual machine session, while still allowing the user to maintain control of the underlying host OS. Additional embodiments and advantages of such embodiments will be apparent to those of skill in the art upon reading and understanding the following description.

Figure 1:
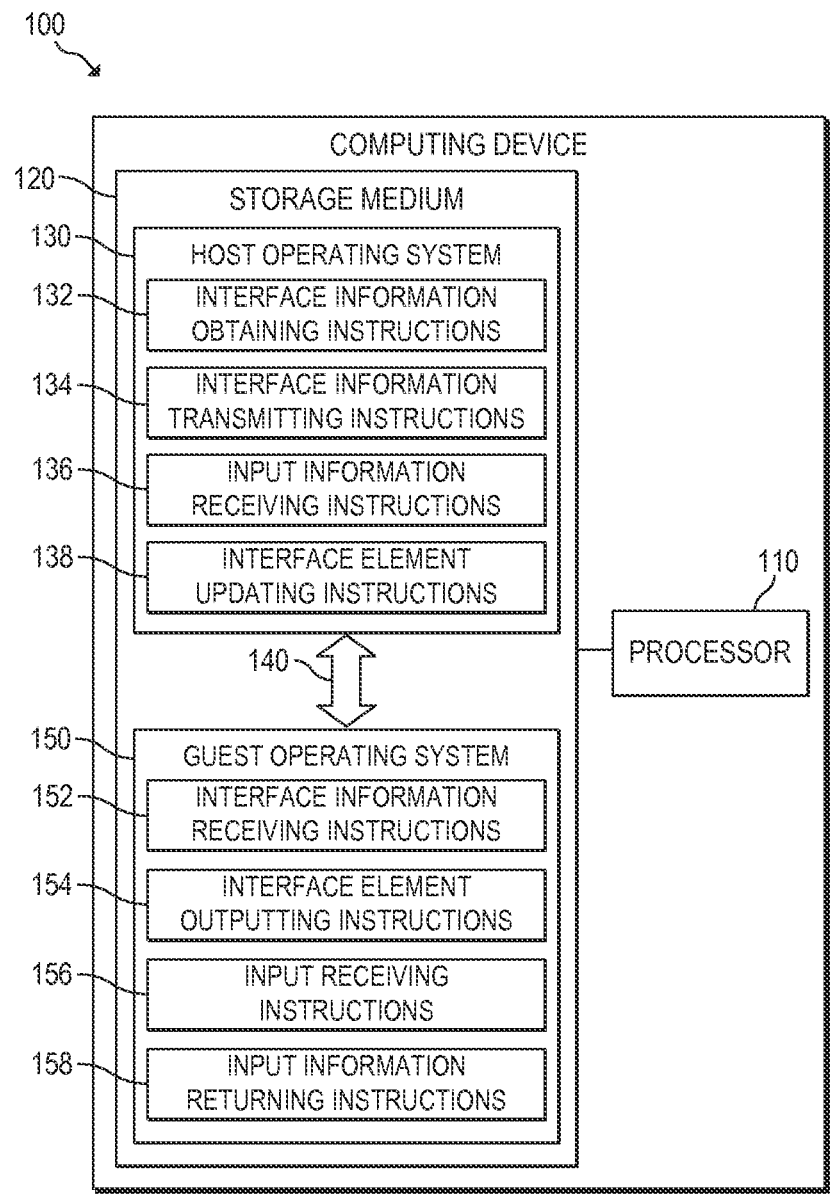
FIG. 1 is a block diagram of an example computing device for enabling user interface elements displayed within a host OS to be displayed within a guest OS of a virtual machine executing on the computing device.

Referring now to the drawings, FIG. 1 is a block diagram of an example computing device 100 for enabling user interface elements displayed within a host OS 130 to be displayed within a guest OS 150 of a virtual machine executing on the computing device 100. Computing device 100 may be, for example, a notebook computer, a desktop computer, an all-in-one system, a thin client, a workstation, a tablet computing device, a mobile phone, or any other computing device suitable for execution of the functionality described below. In the implementation of FIG. 1, computing device 100 includes processor 110 and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 132-138, 152-158 to implement the procedure for displaying host OS user interface elements within guest OS 150, as described below. As an alternative or in addition to retrieving and executing instructions, processor 110 may include one or more electronic circuits comprising a number of electronic components for performing the functionality of one or more of instructions 132-138, 152-158.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for host OS 130 and guest OS 150.

Host OS 130 may be any operating system environment suitable for hosting a virtual machine and a corresponding guest OS 150. Thus, in the case of a Type 1 hypervisor, the term "host OS" may refer to the hypervisor itself, since the hypervisor is an operating system that runs directly on the host's hardware to manage allocation of resources to guest OS 150. In the case of a Type 2 hypervisor, the term "host OS" may refer to the operating system that hosts the hypervisor, which, in turn, allocates resources to guest OS 150.

Regardless of the particular implementation, host OS 130 may include a plurality of sets of instructions 132, 134, 136, 138 for enabling a user to control user interface elements displayed in host OS 130 from within guest OS 150. These instructions may be executed as part of host OS 130 itself or as one or more Dynamic Link Libraries (DLL) or applications executing within host OS 130.

Host OS 130 may include interface information obtaining instructions 132, which may obtain information relating to a user interface element displayed within host OS 130 of computing device 100. For example, obtaining instructions 132 may monitor one or more windows of host OS 130 to obtain details regarding user interface elements currently displayed in host OS 130, but obscured by the window in which the guest OS is displayed. The interface elements monitored by instructions 132 may include any graphical features displayed in host OS 130 with which the user may interact to provide input. For example, each interface element may be a checkbox, slider, dialog box, text box, or any other interface element type and may be located in a window, system tray, taskbar, menu, or other location within host OS 130. The interface element may allow a user to alter the operation of computing device 100 by responding to a reboot message, starting or stopping a virus or malware scan, modifying the volume of an audio interface, connecting to or disconnecting from a network, or otherwise controlling computing device 100.

Regardless of the type of user interface element, obtaining instructions 132 may obtain any information that describes the interface element in detail sufficient to allow guest OS 150 to receive the information and display a corresponding interface element. For example, the information may identify the type of interface element (e.g., checkbox, slider, dialog box, etc.) and any other attributes relating to the element, such as text labels, ranges of possible values, current values, and the like.

Obtaining instructions 132 may obtain the information relating to the interface elements using a number of techniques. In some implementations, obtaining instructions 132 may monitor predetermined system event messages exchanged within host OS 130. For example, obtaining instructions 132 may intercept or otherwise access messages exchanged between components of host OS 130 or exchanged between host OS 130 and applications executing within the OS, such as a message to display or update a user interface element. As another example, obtaining instructions 132 may intercept messages exchanged within an application itself. It should be noted, however, that alternative monitoring techniques may be utilized, provided that obtaining instructions 132 are able to gather the required information describing the user interface elements.

In some embodiments, the particular information to be obtained may be identified by the user. For example, computing device 100 may output a user interface that allows a user to select the particular types of interface elements of interest to the user. Obtaining instructions 132 may then obtain the requested information by monitoring only the interface elements requested by the user. For example, when obtaining the information by monitoring system event messages that are exchanged within host OS 130, obtaining instructions 132 may determine which messages to access based on the user selection of the information of interest.

After obtaining instructions 132 obtain the operating status information, interface information transmitting instructions 134 may transmit the interface element information to guest OS 150 via an established communication channel 140. The mechanism used by transmitting instructions 134 for transmission of the information may vary by embodiment. For example, in some implementations, transmitting instructions 134 may utilize a communication channel 140 established between host OS 130 and guest OS 150 using a socket on a given port or a plug-in.

As detailed further below in connection with instructions 152-158 of guest OS 150, after transmission of the interface information by host OS 130, guest OS 150 may output the interface element, receive input from the user within guest OS 150, and return information describing the input to host OS 130. In response, input information receiving instructions 136 may receive the information describing the user's interaction with the user interface element within guest OS 150. This information may describe the user's input value, such as a selection of a particular checkbox or button, a modification of a slider or drop-down selection, or any other input provided by the user.

In response, receiving instructions 136 may trigger interface element updating instructions 138, which may then update the user interface element displayed within host OS 130 in response to receipt of the input information from guest OS 150. For example, updating instructions 138 may modify the user interface element to reflect the input from the user within guest OS 150. This may entail, for example, updating the position of a slider on a slider bar, marking or unmarking a checkbox, activating a particular button, or similarly changing another type of interface element.

In addition, in response to updating the interface element, host OS 130 or the application that has displayed the interface element may also trigger an appropriate action. For example, when the interface element relates to the operation of computing device 100, host OS 130 or the application may modify a corresponding operating property of device 100. To give a specific example, suppose the user interface element is an update dialog message providing the user with the option of immediately rebooting device 100 or postponing the reboot until a later time and the user decided to immediately reboot from within guest OS 150. In response to receipt of the information describing the user's selection, host OS 130 may activate the "reboot" button in the interface, thereby triggering an immediate reboot of device 100.

Guest OS 150 may be any operating system suitable for execution within a virtual machine environment hosted by host OS 130. As illustrated, guest OS 150 may include a plurality of sets of instructions 152, 154, 156, 158 for enabling a user to control user interface elements displayed in host OS 130 from within guest OS 150. These instructions may be executed as part of guest OS 150 itself or as one or more DLLs or applications executing within guest OS 150.

During execution of a virtual machine, interface information receiving instructions 152 may receive the information relating to user interface elements displayed within host OS 130 from host OS 130. For example, as detailed above, transmitting instructions 134 may send information regarding currently-displayed user interface elements via a communication channel 140. Receiving instructions 152 may then parse the received interface element information and provide the received information to an appropriate process for output of a corresponding interface element within guest OS 150.

After receipt of the interface element information, interface element outputting instructions 154 may then output a corresponding user interface element in a window in which guest OS 150 is currently displayed. For example, outputting instructions 154 may be configured to read the received information and display an appropriate visual representation of the interface element within the guest OS window. Outputting instructions 154 may display any visual indication of the interface element information provided that the indication is sufficient for the user to interact with the interface element within guest OS 150. Thus, the outputted element may be any displayed object that is similar or identical to the element outputted in host OS 130, such that the user may provide input to the element from within guest OS 150. For example, the outputted element may be a system tray element, taskbar item, menu item, or any other visual element displayed within guest OS 150.

Upon output of the corresponding user interface element within guest OS 150, input receiving instructions 156 may begin monitoring for user interaction with the interface element. When a user activates the interface element using a mouse, keyboard, touch, or some other input mechanism, receiving instructions 156 may receive a notification of the input including parameters describing the input. For example, the description of the input may identify the particular user interface element and describe the details of the input, such as the new value of the interface element (e.g., a value in a slider bar) or a particular element that was selected (e.g., a given button, checkbox, radio button, etc.).

Finally, input information returning instructions 158 may return input information describing the user input to guest OS 150. The returned input information may identify the corresponding interface element within host OS 130 and, as detailed above, include details regarding the user's interaction with the element within guest OS 150. In response, as detailed above in connection with instructions 136 and 138, host OS 130 may then receive the input information and update the corresponding interface element in host OS 130.

Figure 2:
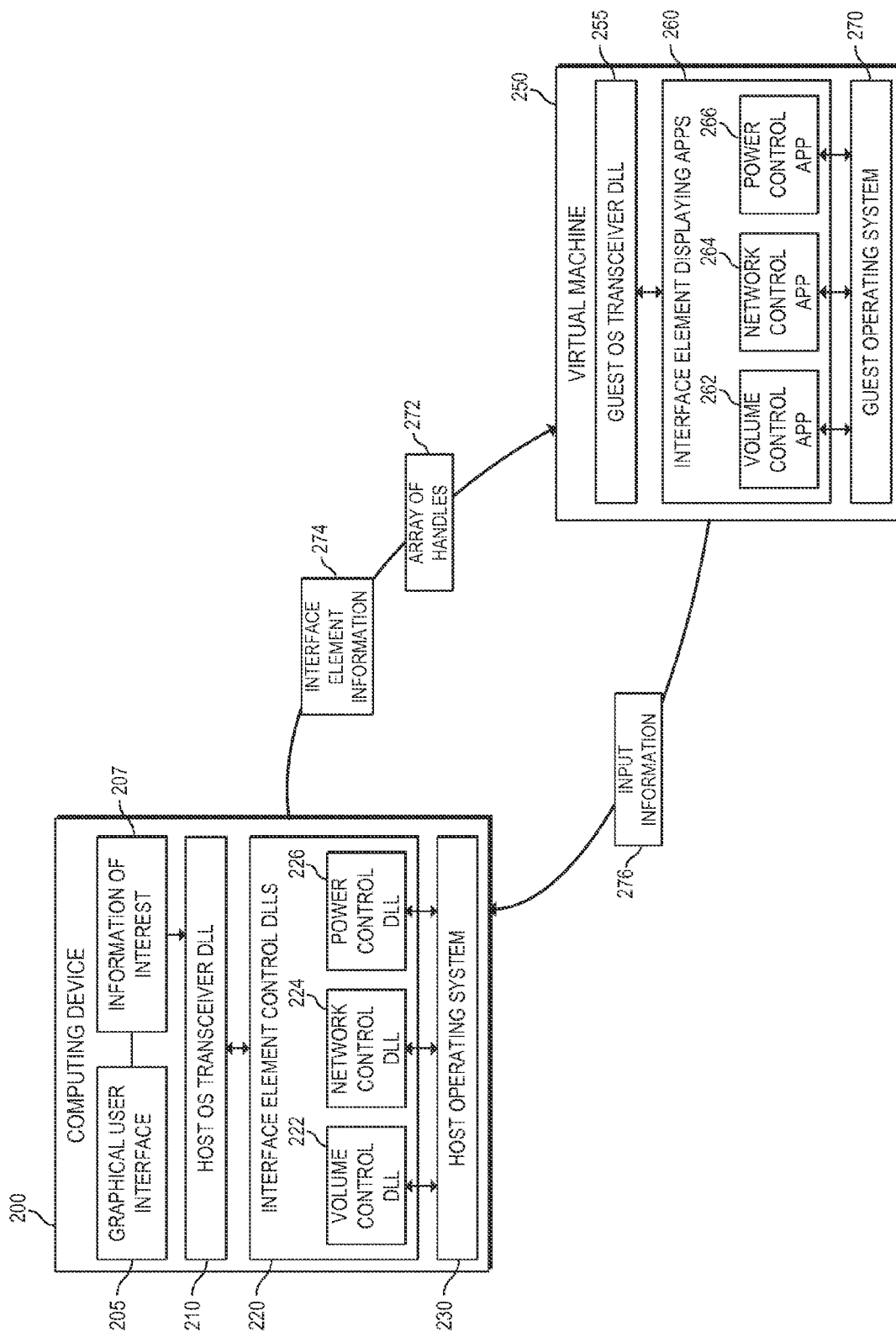
FIG. 2 is a block diagram of an example host OS of a computing device in communication with a guest OS of a virtual machine for allowing interface elements displayed within the host OS to be interacted with in the guest OS.

FIG. 2 is a block diagram of an example host OS 230 of a computing device 200 in communication with a guest OS 270 of a virtual machine 250 for allowing interface elements displayed within host OS 230 to be interacted with in guest OS 270. Note that, although illustrated below as separate blocks, virtual machine 250 may in practice be executed by computing device 200 within host OS 230.

As illustrated, computing device 200 may include a graphical user interface 205, information of interest 207, a host OS transceiver Dynamic Link Library (DLL) 210, a plurality of interface element control DLLs 220, and a host operating system 230. In some implementations, graphical user interface 205, DLLs 210, 220, and host OS 230 may be implemented as a series of instructions encoded on a storage medium and executed by a processor of computing device 200. Note that, although described below as dynamic link libraries, the functionality of DLLs 210, 220 may be implemented as another type of library, as an executable application, or as any other set of executable instructions.

Computing device 200 may display graphical user interface 205, which may be configured to receive a user selection of interface elements to be monitored and displayed within guest OS 270 of virtual machine 250. For example, GUI 205 may display a listing of interface element information that can be monitored and corresponding selection interface elements, such as a group of checkboxes. The user may select the information of interest, which may then be stored as information of interest 207 for subsequent access by host OS transceiver DLL 210.

Host OS transceiver DLL 210 may comprise a set of instructions for managing the collection of interface element information of host OS 230. Upon initialization of virtual machine 250, transceiver DLL 210 may establish a communication session with guest OS transceiver DLL 255 of virtual machine 250. Transceiver DLL 210 may then launch control DLLs 220 according to the user selections stored in information of interest 207, such that a separate DLL 222, 224, 226 is loaded to monitor the user interface elements for each selected type. For example, suppose the user has indicated interest in the display of interface element information regarding a volume level, wireless network settings, and the power state of device 200. In response, host OS transceiver DLL 210 may launch volume control DLL 222, network control DLL 224, and power control DLL 226, each corresponding to one of the user-selected types of interface element information.

After launching the appropriate DLLs, transceiver DLL 210 may receive, from each control DLL 220, a predetermined handle that uniquely identifies the interface element information that the corresponding DLL 220 will gather. The handle may be, for example, a string of alphanumeric characters, an integer, or any other information sufficient to uniquely identify a type of interface element information. Host OS transceiver DLL 210 may then transmit an array of handles 272 to guest OS 270 of virtual machine 250. In response, as described in further detail below, guest OS transceiver DLL 255 may launch the corresponding interface element displaying applications 260 to process the interface element information to be subsequently transmitted to the virtual machine 250.

During operation, each control DLL 220 may monitor for a given type of interface element information of host OS 230. In particular, each control DLL 220 may gather information in the manner described above in connection with obtaining instructions 132 of FIG. 1. For example, each control DLL 220 may be configured to monitor system event messages exchanged within host operating system 230 that relate to the particular type of information to be monitored. Continuing with the previous example, volume control DLL 222 may collect information regarding a volume control UI element, such as the current mute status and the volume level indicated by a slider control. Similarly, network control DLL 224 may collect information regarding a networking control element, such as a user interface element that allows a user to connect or disconnect from a network. Finally, power control DLL 226 may collect information regarding power state messages, such as a dialog box that triggers an automatic reboot of device 200 upon installing an update.

Upon gathering the required information, each control DLL 220 may provide the interface element information to host OS transceiver DLL 210 along with a corresponding handle. In response, host OS transceiver DLL 210 may then forward the gathered interface element information 274 to guest OS transceiver DLL 255. When transmitting information 274, host OS transceiver DLL 210 may also include the corresponding handle that identifies the particular type of interface element information.

As detailed below, virtual machine 250 may receive interface element information 274, output corresponding user interface elements within guest OS 270, and return input information 276 to host OS 230 in response to receipt of user input within guest OS 270. In response to receiving input information 276 from virtual machine 250, the host OS transceiver DLL 210 may provide information 276 to the appropriate DLL 222, 224, 226. The DLL 222, 224, 226 may then update the user interface element within host OS 230, such that the input provided by the user in guest OS 270 takes effect in host OS 230.

As illustrated, virtual machine 250 may include a guest OS transceiver DLL 255 and interface element displaying applications 260. Note that, although described below as a dynamic link library, the functionality of DLL 255 may be implemented as another type of library, as an executable application, or as any other set of executable instructions.

Guest OS transceiver DLL 255 may comprise a set of instructions for managing receipt and display of interface element information 274 collected in host OS 230. Upon initialization of virtual machine 250, transceiver DLL 255 may establish communication with host OS transceiver DLL 210. Transceiver DLL 255 may then receive an array of handles 272 from DLL 210, where each handle identifies a corresponding type of interface element information to be transmitted to guest OS 270. In response, transceiver DLL 255 may then load a respective process 260 for each handle to manage the process for receiving the interface element information 274 and outputting a corresponding user interface element within guest OS 270.

Continuing with the example above, suppose that device 200 has launched volume control DLL 222, network control DLL 224, and power control DLL 226. In response to receipt of the handles 272 identifying the interface element information, transceiver DLL 255 may read the handles and, in response, launch volume control application 262, network control application 264, and power control application 266.

During operation, each displaying application 260 may receive interface element information 274 forwarded by transceiver DLL 255 based on the handle associated with the interface element information. In response, each application 260 may then output a corresponding interface element within guest OS 270 in the manner described above in connection with outputting instructions 154 of FIG. 1. For example, volume control DLL 222 may display a slider and a mute button for controlling the audio settings in the system tray, network control DLL 224 may output a dialog box for allowing the user to connect or disconnect from a network or a similar element in the system tray, and power control DLL 226 may output a message asking the user whether he or she wishes to reboot device 200 immediately.

After outputting the interface element for each type of information, guest OS 270 may then begin monitoring for input from the user. Upon selection, modification, or other interaction with the displayed user interface element by the user within guest OS 270, the corresponding status displaying application 260 may return information 276 describing the user's input to host OS 230 via guest OS transceiver DLL 255. The input information 276 may identify the particular user interface element and include details describing how the element was selected, modified, or otherwise interacted with. As described above, device 200 may respond by updating the corresponding user interface element within host OS 230.

Figure 3A:
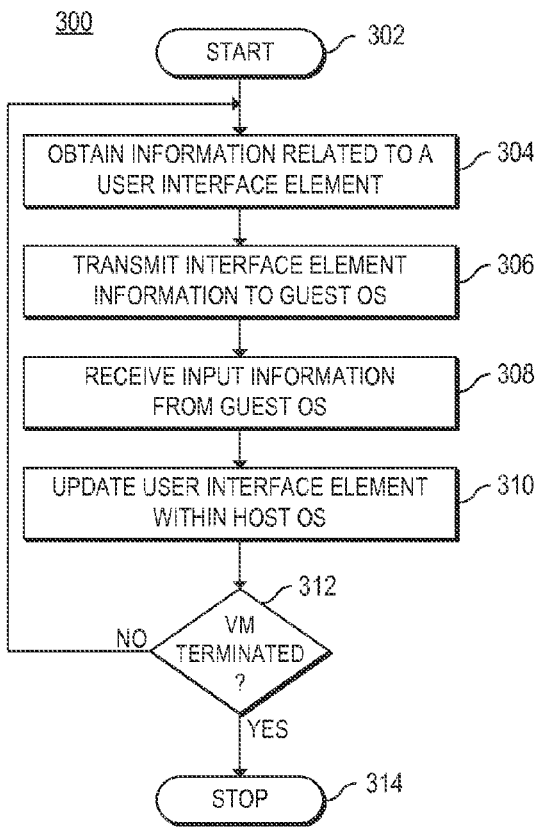
FIG. 3A is a flowchart of an example method for execution within a host OS to transmit information relating to user interface elements to a guest OS.
Figure 3B:
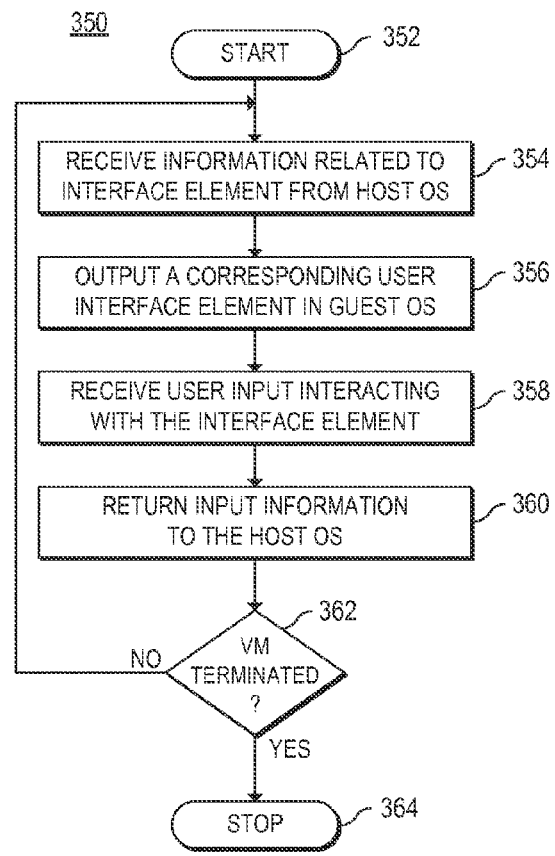
FIG. 3B is a flowchart of an example method for execution within a guest OS to receive interface element information from a host OS and display a corresponding interface element within the guest OS.
Figure 4A:
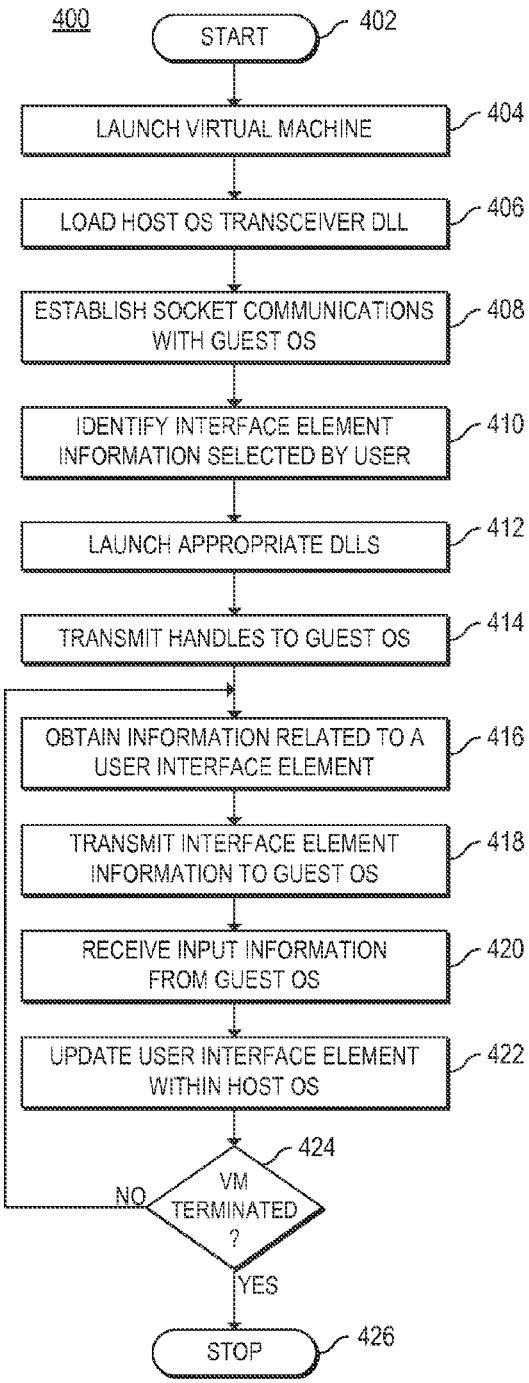
FIG. 4A is a flowchart of an example method for execution within a host OS to transmit information relating to user interface elements to a guest OS using a plurality of dynamic link libraries.
Figure 4B:
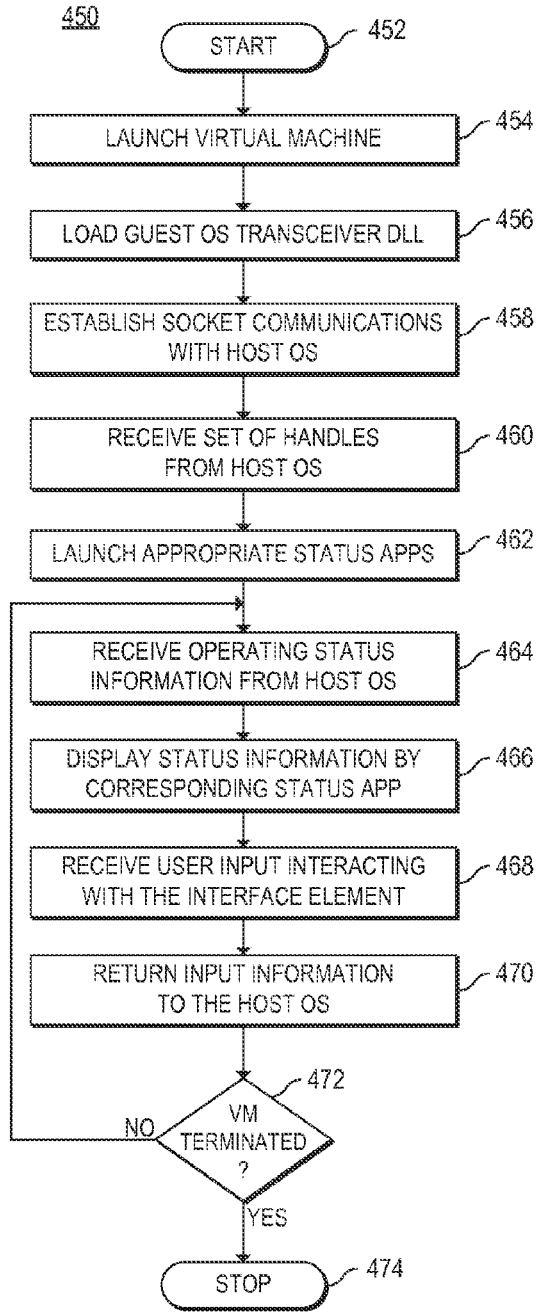
FIG. 4B is a flowchart of an example method for execution within a guest OS to receive interface element information from a host OS and display corresponding interface elements within the guest OS using a plurality of applications.

FIGS. 3A & 4A are flowcharts of example methods 300, 400 for execution within host operating systems 130, 230, respectively. Similarly, FIGS. 3B & 4B are flowcharts of example methods 350, 450 for execution by guest operating systems 150, 270, respectively. Although execution of methods 300, 350, 400, 450 is described below with reference to these operating systems, other suitable components for execution of the methods will be apparent to those of skill in the art. Methods 300, 350, 400, 450 may be implemented in the form of instructions executable by a processor and/or in the form of electronic circuitry.

FIG. 3A is a flowchart of an example method 300 for execution within a host OS 130 to transmit information relating to user interface elements to a guest OS 150. Method 300 may start in block 302 and proceed to block 304, where one or more processes executing within host OS 130 may begin obtaining information relating to user interface elements currently displayed in host OS 130. For example, each process may obtain information that describes the interface element in detail sufficient to allow guest OS 150 to receive the information and display a corresponding interface element. After gathering the information in block 304, host OS 130 may then begin transmitting the interface element information to guest OS 150 in block 306.

As described below in connection with FIG. 3B, guest OS 150 may then output a corresponding interface element, receive input from the user interacting with the element in guest OS 150, and subsequently return details regarding the input to host OS 130. In response, in block 308, host OS 130 may receive the input information from guest OS 150. In block 310, host OS 130 may then update the user interface element within host OS 130 by, for example, modifying the user interface element to reflect the input from the user within guest OS 150.

In block 312, host OS 130 may determine whether the virtual machine has been terminated. If virtual machine has not been terminated and is therefore still in operation, method 300 may return to block 304, where processes running within host OS 130 may continue monitoring for user interface element information. Otherwise, if the virtual machine has been terminated, method 300 may continue to block 314, where method 300 may stop.

FIG. 3B is a flowchart of an example method 350 for execution within a guest OS 150 to receive interface element information from a host OS 130 and display a corresponding interface element within the guest OS 150. Method 350 may start in block 352 and proceed to block 354, where guest OS 150 may receive information related to an interface element currently displayed in host OS 130.

Next, in block 356, guest OS 150 may parse the received interface element information and output a corresponding interface element within guest OS 150. This interface element may be similar or identical to the interface element displayed within host OS 130, such that the user may provide input to the element from within guest OS 150. The displayed interface element may be located in any position in the window of guest OS 150, such as in the system tray, taskbar, or another menu.

After receiving input from a user interacting with the displayed interface element in block 358, guest OS 150 may then return input information to host OS 130 in block 360. The returned input information may be any information sufficient to identify the particular user interface element and to describe the details of the input. As detailed above in connection with FIG. 3A, host OS 130 may then receive the input information and update the corresponding interface element within host OS 130.

In block 362, if the virtual machine has not been terminated and is therefore still in operation, method 350 may return to block 354, where guest OS 150 may continue to receive interface element information from host OS 130. Otherwise, if the virtual machine has terminated, guest OS 150 is also terminated, so method 350 may continue to block 364, where method 350 may stop.

FIG. 4A is a flowchart of an example method 400 for execution within a host OS 130 to transmit information relating to user interface elements to a guest OS 150 using a plurality of dynamic link libraries. Method 400 may start in block 402 and proceed to block 404, where device 200 may launch a virtual machine 250 including a guest OS 270.

In block 406, upon initialization of the virtual machine, host OS 230 may then load a host OS transceiver DLL 210 for managing communications with a corresponding guest OS transceiver DLL 255. In block 408, host OS transceiver DLL 210 may establish communications with guest OS transceiver DLL 255 using, for example, an available socket or plug-in.

In block 410, host OS transceiver DLL 210 may then determine the interface element information of interest to the user based on the user's selections in a graphical user interface 205. Based on the information of interest 207, host OS transceiver DLL 210 may then launch the appropriate control DLLs 220 in block 412. For example, host OS transceiver DLL 210 may launch a volume control DLL 222, a network control DLL 224, and a power control DLL 226. Each control DLL 220 may then return a handle and, in block 414, host OS transceiver DLL 210 may transmit the handles 272 to guest OS 270.

After initializing the virtual machine and corresponding DLLs in blocks 404 to 414, host OS 230 may begin monitoring interface element information in block 416. For example, each control DLL 220 may monitor system event messages exchanged within host OS 230 or applications running in host OS 230 and may thereby extract the appropriate interface element information. Each control DLL 220 may then return the interface element information along with a corresponding handle to host OS transceiver DLL 210.

In block 418, host OS transceiver DLL 210 may then transmit the interface element information 274 including each handle to guest OS 270. As detailed below in connection with FIG. 4B, a corresponding control application 262, 264, 266 running in guest OS 270 may then receive the interface element information, display a corresponding interface element in guest OS 270, receive input from the user interacting with the interface element, and return input information 276 to host OS transceiver DLL 210.

Thus, in block 420, host OS transceiver DLL 210 may receive input information 276 and provide the information to the corresponding control DLL 220, as identified using a handle included with input information 276. Finally, in block 422, the corresponding control DLL 220 may update the user interface element within host OS 230, thereby triggering any corresponding actions within host OS 230.

In block 424, host OS 230 may determine whether the virtual machine has been terminated. If virtual machine has not been terminated and is therefore still in operation, method 400 may return to block 416, where each DLL 220 may continue monitoring for user interface element information. Otherwise, if the virtual machine has been terminated, method 400 may continue to block 426, where method 400 may stop.

FIG. 4B is a flowchart of an example method 450 for execution within a guest OS 270 to receive interface element information from a host OS 230 and display a corresponding interface element within guest OS 270 using a plurality of applications 260. Method 450 may start in block 452 and proceed to block 454, where device 200 may launch virtual machine 250 including guest OS 270.

In block 456, upon initialization of the virtual machine, guest OS 270 may then load a guest OS transceiver DLL 255 for managing communications with a corresponding host OS transceiver DLL 210. In block 458, guest OS transceiver DLL 255 may establish communications with host OS transceiver DLL 210 using, for example, an available socket or plug-in.

In block 460, guest OS transceiver DLL 255 may then receive a set of handles 272 from host OS transceiver DLL 210. In response, in block 462, guest OS transceiver DLL 255 may then launch displaying applications 260 corresponding to the received handles. For example, guest OS transceiver DLL 255 may launch a volume control application 262, a network control application 264, and a power control application 266.

In block 464, guest OS transceiver DLL 255 may receive interface element information 274 from host OS transceiver DLL 210 and, in response, may forward the information 274 to the appropriate application 260 based on the included handle. In block 466, the corresponding application 260 may then display a corresponding interface element within guest OS 270. Next, in block 468, the application 260 may receive input from a user interacting with the displayed interface element within guest OS 270. In response, in block 470, the application 260 may forward information describing the input to guest OS transceiver DLL 255, which may then transmit the input information 276 to host OS transceiver DLL 210.

In block 472, if the virtual machine has not been terminated and is therefore still in operation, method 450 may return to block 464, where guest OS 270 may continue to receive interface element information from host OS 230. Otherwise, if the virtual machine has terminated, guest OS 270 is also terminated, so method 450 may continue to block 474, where method 450 may stop.

Figure 5:
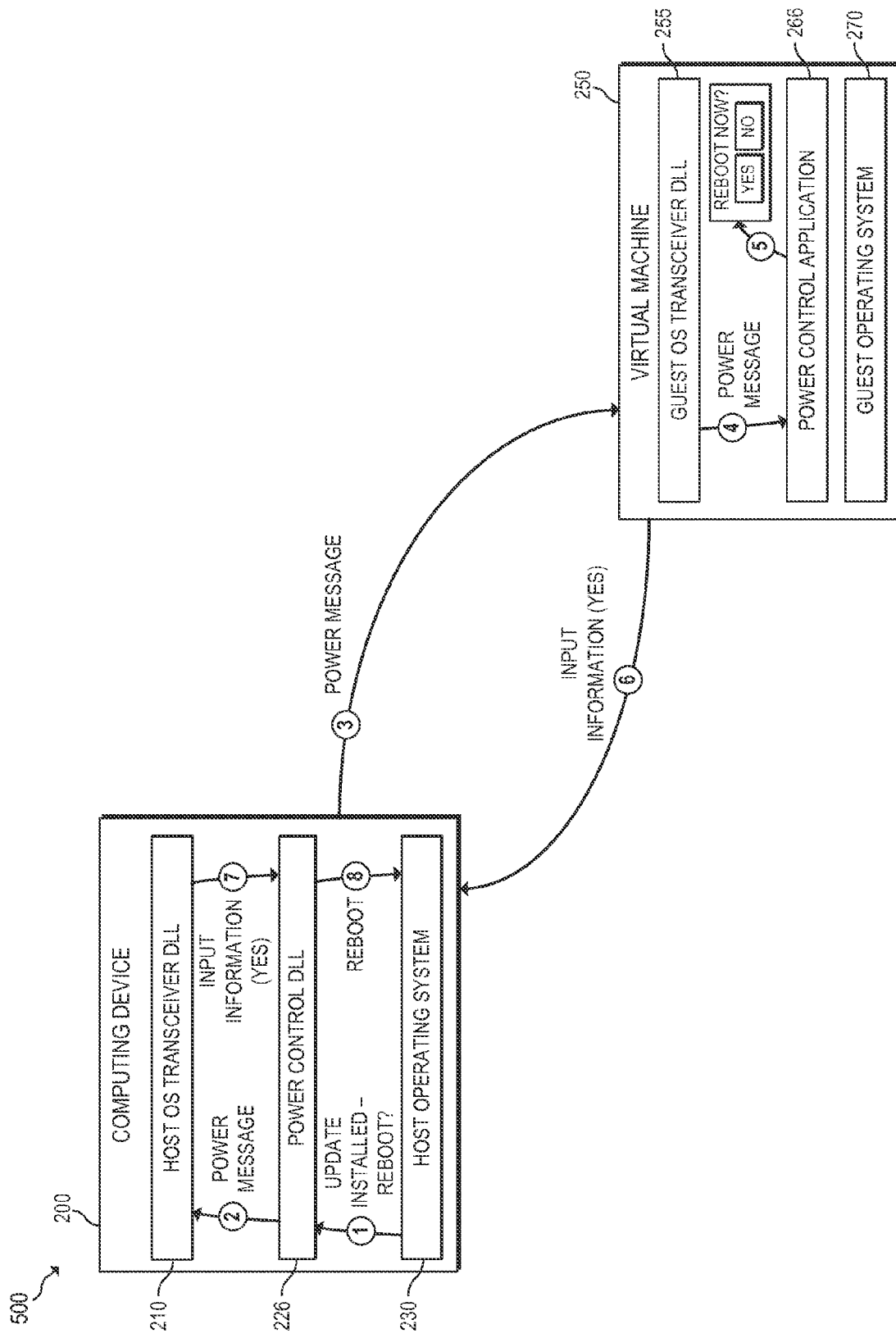
FIG. 5 is a block diagram of an example sequence of operations for displaying a power state interface element within a guest OS of a virtual machine executing on the computing device.

FIG. 5 is a block diagram of an example sequence of operations 500 for displaying a power state interface element within a guest OS 270 of a virtual machine 250 executing on the computing device 200. Although described below with reference to the components of FIG. 2, it should be noted that sequence 500 may be applicable to any virtual machine environment. In the description that follows, it is assumed that device 200 has initialized virtual machine 250 and that host OS 230 and guest OS 270 have established communications.

As illustrated, the sequence starts in block 1, where power control DLL 226 detects a power message within host OS 230. In this example, suppose host OS 230 has installed an automatic update and that the power message is an automatic reboot message giving the user the option of rebooting immediately by selecting "Yes" or postponing the reboot by selecting "No." In response, in block 2, power control DLL 226 generates information describing the interface element and provides this as a message to host OS transceiver DLL 210. Then, in block 3, host OS transceiver DLL 210 forwards the power message to guest OS transceiver DLL 255.

In block 4, guest OS transceiver DLL 255 receives the power message, detects the handle (e.g., "POWER_MSG"), and therefore forwards the message to power control application 266. In block 5, power control application 266 parses the message, determines that an automatic update message has been displayed in host OS 230, and therefore outputs a corresponding interface element within guest OS 270. As illustrated, the interface element provides the user with the option of rebooting immediately by selecting "Yes" or postponing the reboot by selecting "No."

Assuming that the user selects "Yes" within guest OS 270, in block 6, power control application 266 provides the input information to guest OS transceiver DLL 255, which then forwards the input information to host OS transceiver DLL 210. In block 7, host OS transceiver DLL 210 provides the input information to power control DLL 226. Finally, in block 8, power control DLL 226 provides the response to the appropriate window within host OS 230, thereby triggering a reboot of device 200.

According to the foregoing, example embodiments disclosed herein enable a user of a virtual machine to interact with interface elements of the host OS within the guest OS window. In this manner, the user may maintain control of the host OS without having to minimize or otherwise interfere with the virtual machine session. Example embodiments thereby provide users with a virtual machine experience that more closely emulates the experience of running the guest OS as the primary OS.

We claim:

1. A computing device comprising:
a processor to:
transmit information relating to a user interface element displayed within a host operating system (OS) from the host OS to a guest OS of a virtual machine executing within the host OS;
display, in response to receipt of the information in the guest OS, a corresponding user interface element in a window in which the guest OS is currently displayed;
receive input from a user interacting with the corresponding user interface element displayed in the guest OS;
return information describing the user input from the guest OS to the host OS;
include a particular handle when transmitting the information from the host OS to the quest OS, the included handle identifying the particular type of information;
provide the information received from the host OS to a respective application of a plurality of applications executing within the quest OS, wherein the respective application is selected based on the included handle; and
output the corresponding user interface element in the quest OS by the respective application.

2. The computing device of claim 1, wherein the processor is further to: update the user interface element displayed within the host OS in response to receipt of the input information from the guest OS.

3. The computing device of claim 2, wherein the processor is further to: modify an operating property of the computing device in response to updating the user interface element displayed within the host OS.

4. The computing device of claim 1, wherein the user interface element displayed within the host OS is a system tray element, a taskbar item, or a menu item obscured by the window in which the guest OS is currently displayed.

5. The computing device of claim 1, wherein the processor is further configured to:
transmit at least one handle from the host OS to the guest OS upon initiation of the virtual machine, each handle identifying a particular type of information to be subsequently transmitted to the guest OS.

6. The computing device of claim wherein the processor is to:
load a plurality of Dynamic Link Libraries (DLLs) in the host OS, each DLL monitoring for a respective type of information, and
load a plurality of applications in the guest OS, each application receiving the respective type of information from a corresponding DLL and displaying the corresponding user interface element for the respective type of information.

7. The computing device of claim 1, wherein the processor is further to obtain the information relating to the user interface element by monitoring system event messages exchanged within the host OS.

8. A non-transitory machine-readable storage medium encoded with instructions that when executed cause a processor of a computing device to:
obtain information relating to a user interface element displayed within a host OS of the computing device;
transmit the information related to the user interface element to a guest OS of a virtual machine executing within the host OS;
receive input information from the guest OS, the input information describing a user interaction with the user interface element within the guest OS;
update the user interface element within the host OS in response to the received input information;
include a particular handle when transmitting the information related to the user interface element from the host OS to the guest OS, the included handle identifying the particular type of information;
provide the information received from the host OS to a respective application of a plurality of applications executing within the guest OS, wherein the respective application is selected based on the included handle; and
output the corresponding user interface element in the guest OS by the respective application.

9. The non-transitory machine-readable storage medium of claim 8, further comprising:
display a selection user interface, the selection user interface is to receive a user selection of information to be obtained,
wherein the instructions when executed further cause the processor to monitor a property of the host OS corresponding to the information to be obtained.

10. The non-transitory machine-readable storage medium of claim 8, wherein the instructions comprise a plurality of Dynamic Link Libraries (DLLs) executing within the host OS, each DLL corresponding to a particular type of information.

11. The non-transitory machine-readable storage medium of claim 10, wherein the instructions when executed further cause the processor to provide the information gathered by each DLL to a corresponding application executing within the guest OS for output of a corresponding user interface element within the guest OS.

12. A method for execution by a computing device for displaying interface elements within a guest OS of a virtual machine executing within a host OS of the computing device, the method comprising:
receiving, in the guest OS, information relating to a user interface element displayed within the host OS;
outputting a corresponding user interface element in a window in which the guest OS is currently displayed;
receiving input from a user interacting with the corresponding user interface element displayed in the guest OS;
returning input information describing the user input from the guest OS to the host OS;
including a particular handle when transmitting the information related to the user interface element from the host OS to the guest OS, the included handle identifying the particular type of information,
providing the information received from the host OS to a respective application of a plurality of applications executing within the guest OS, wherein the respective application is selected based on the included handle; and
outputting the corresponding user interface element in the quest OS by the respective application.

13. The method of claim 12, wherein the user interface element displayed within the host OS relates to: a volume setting of an audio interface of the computing device, a power state message displayed within the host OS, or a network setting of a network interface of the computing device.

14. The method of claim 12, wherein the information relating to the user interface element is received from the host OS via a socket between the host OS and the guest OS on a given port.

\* \* \* \* \*